United States Patent [19]
Fry, Jr.

[11] Patent Number: 6,018,502
[45] Date of Patent: Jan. 25, 2000

[54] LONG LIFE COAXIAL SPARKER FOR UNDERWATER SOUND SOURCE

[75] Inventor: Leolan H. Fry, Jr., Panama City, Fla.

[73] Assignee: The United States of America as represented by the Secretary of the Navy, Washington, D.C.

[21] Appl. No.: 09/014,010

[22] Filed: Jan. 27, 1998

[51] Int. Cl.$^7$ ................................................. G10K 15/06
[52] U.S. Cl. ................................................................ 367/147
[58] Field of Search ............................................. 367/147

[56] References Cited

U.S. PATENT DOCUMENTS 3,728,671  4/1973  Poston, Jr. ............................... 367/147

*Primary Examiner*—Daniel T. Pihulic
*Attorney, Agent, or Firm*—Harvey A. Gilbert; Kenneth W. Dobyns

[57] ABSTRACT

An efficient sparker for a pulse powered underwater acoustic source for minesweeping is capable of repetitive discharges at about 15 Hz for at least one hour without replacement or maintenance. The sparker has a tubularly-shaped cathode spaced apart from an elongate anode that coaxially extends the length of the tubularly-shaped cathode and a cylindrically-shaped insulator that fills the space between the cathode and anode. The cathode, anode, and insulator are secured to a collar and are shaped to have minimal drag when towed through the water at speeds up to 35 knots. The configuration and selection of fabrication materials for the sparker assure that a nominal constant gap is maintained between the cathode and anode.

21 Claims, 2 Drawing Sheets

LONG LIFE COAXIAL SPARKER FOR UNDERWATER SOUND SOURCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sources that emit acoustic energy underwater. In particular, this invention relates to a sparker including electrodes and insulation for a pulse powered underwater sound source for minesweeping.

Currently, efforts are being made to develop new high speed, remote/autonomous minesweeping systems that will fit on small surface platforms. The acoustic technology chosen for this effort has concentrated on pulse powered sparkers where bursts of electrical current are discharged in the water by a sparker device that operates much like a spark plug in an automobile engine. Each discharge produces a bubble in the water much like detonation of a chemical explosive. The noise created by the chemical explosive or discharged bubble is primarily generated by the large pressure pulses emanating from the expansion and collapse of the bubble. The choice of the spark gap for the sparklers was driven by the need for low in-water drag during high speed transit and minesweeping operations, relatively good efficiency at low frequencies, and some capability to change the acoustic output to emulate the signature of a specific craft. While underwater discharges have been under investigation for several decades, most of the work involved single shot laboratory systems or systems that fire a burst of shots over a relatively short period of time, e.g. during a few seconds. The driving requirement for this needed design is that the sparker must be capable of operating over extended periods of time extending from tens of minutes to hours, without having to stop operation for adjustment or replacement. Accordingly, the performance of such a system is highly dependent on the spacing of the gap between electrodes and exposure of the positive electrode (anode) especially if the gap and/or the surface area of the anode exposed to the sea water becomes too large for the pulse power system to efficiently break down the water. Additionally, the operation of the desired system in terms of acoustic output had to be relatively consistent from spark to spark or from one group of sparks to another; the sparker had to be small in size to minimize drag; and the sparker had to be relatively cheap to fabricate and be easily installed.

Recently, efforts in developing a spark that can be reproduced over a long period have been mostly concerned with developing air-gap switches. Currently, the greatest use of underwater sparkers in a repetitive mode is in lithotripsy (a commercial medical application). However, the sparkers typically only lasted a few hundred shots which would amount to less than a minute's operation in the minesweeping application. Furthermore, the lithotripsy sparkers are used at much lower energies than those required for minesweeping so that these designs would not hold up during prolonged minesweeping. This is because the erosion of the sparkers typically scales with energy of discharge for a given system.

In the 1960's several underwater sparkers were developed for the oil exploration industry. These systems typically operated at a repetition rate almost 40 to 60 times less than that required for successful minesweeping. Moreover, the efficiency of these systems varied. One system with the best efficiency used a wire initiated discharge system that fed a small gauge wire across a pair of electrodes. Electric current then passed through the wire causing it to vaporize and create the plasma for the discharge. The other system used a single electrode which created a corona discharge at the tip of the electrode as current passed from the electrode to salt water that acted as the negative electrode. The efficiency of this system was typically poor but was compensated for by using large discharge energies.

In addition, other previous attempts by different groups to develop a long life sparker involved the use of point-to-point electrodes. Point to point electrodes are electrodes that face each other on an axis going through their centerline. In the first attempt the electrodes were hollow rods through which heavy gauge wire was fed. The wires were positioned a specific distance apart (~0.25 inches). The discharge occurred between the ends of the wires and resulted in the erosion of both wires. This caused the gap between the wires to grow and the center of the gap to move to one electrode's feeder rod since the erosion was different for the different rod polarities. The feeder mechanisms for the wires had to not only compensate for the enlarged gap but also for the shift in the gap center. Additionally, the erosion of the soft copper wire was not constant from shot to shot. To deal with these challenges a controller system was built that required monitoring the intergap resistance between shots. This was effected by the residue left in the water from the discharges. A two quadrant optical system also was needed to detect the discharge position. The resulting system was complex and difficult to properly adjust and, in fact, was never successfully demonstrated. In addition, the system had poor efficiency and could not break down water with considerably less salt content than sea water. This required the sparker to operate in a large fresh water chamber which also called for ancillary water conditioning systems. This made the system much too large and cumbersome.

In the second attempt to develop a long life sparker, the electrodes were thin-wall cylindrical stainless tubes which were mounted on an isolating substrate with the rods facing each other. The electrical connection to the cathode was made via a small rod that passed through the center of the isolating substrate that separated the electrodes. This configuration was thought to enhance the break down of the water. This configuration had better shot to shot performance in terms of efficiency and could break down sea water, but the erosion rates of the insulating substrate and the electrodes were high so that the sparker had a lifetime that was limited to within minutes. Bulkier electrodes were tried to increase the lifetime but the efficiency dropped off dramatically and the lifetime of the substrate was still an unsolved problem. Different materials were tried for the substrate but none gave performance close to what was needed.

A more recent attempt to develop a long life sparker began by investigating the configurations of other sparker systems, especially those mentioned above that had been developed for oil exploration. The wire initiated concept was of interest because of its high efficiency which is important for keeping the size of the overall system down. A test article was designed, fabricated and operated with some success. However, it was found that developing a reliable wire feed system that could feed the wire at the rates required for successful operation would be difficult at best and would require an unduly long time to perfect.

The concept of using a sparker having a single electrode that is referred to above was given renewed interest because of its inherent simplicity. This feature, it was thought, might facilitate developing a long-life sparker provided that the efficiency could be improved. Further experiments with the single electrode design indeed showed that the efficiency could be improved significantly with the optimum selection of circuit components; however, this improvement was still not sufficient to meet the minimum requirements needed for minesweeping over long periods with some margin. Additionally, the erosion of the electrode insulation was still problematic.

Thus, in accordance with this inventive concept, a need has been recognized in the state of the art for a cost-effective coaxial sparker for pulsed underwater sound sources that maintains a relatively constant gap between a cathode and a coextensive, coaxial anode separated by an insulator.

SUMMARY OF THE INVENTION

The present invention is directed to providing a sparker for an underwater sound source. A tubularly-shaped cathode is spaced apart from an elongate anode that coaxially extends the length of the tubularly-shaped cathode and a cylindrically-shaped insulator fills the space between the cathode anode.

An object is to provide a sparker including electrodes and an interposed insulator for a pulse powered underwater acoustic source for minesweeping.

Another object is to provide a sparker having an efficiency useful for minesweeping systems; efficiency is the ratio of acoustic energy emanated by the sparker to the energy stored in the discharge capacitors.

Another object is to provide a sparker capable of repeatedly discharging in saltwater environments for one hour or more without replacement or maintenance.

Another object is to provide sparkers configured to create minimal drag while passing through the water at speeds up to 35 knots.

Another object is to provide a sparker that maintains a substantially constant gap spacing between a coaxial anode and cathode and a minimal anode exposure.

Another object of the invention is to provide a sparker configuration in which a coaxial anode, insulation, and cathode erode at essentially the same rate with minimal exposure of the anode to the seawater.

Another object is to provide a sparker produced at reasonable costs by using commercially available materials and parts.

Another object of the invention is to provide sparkers having anode rods manufactured by compressing mixtures of copper and tungsten granules at high pressures and sintering them at temperatures above the melting temperatures of copper to assure sufficient hardness for erosion resistance and good conductivity for maximum energy transfer.

Another object is to provide a sparker having an insulator that erodes with axial uniformity to reduce tunneling and premature deterioration and/or destruction of the sparker.

Another object is to provide a sparker having erosion of the anode and insulation closely matched to maintain the electrical gap of the sparker approximately the same with minimal exposure of the anode to the seawater during operation of the sparker.

Still another object of the invention is to provide a tube-shaped cathode coaxial with the anode that is rugged enough to withstand the substantial forces exerted on it by the expansion and collapse of the discharge bubble.

Another object is to provide a tube-shaped cathode coaxial with the anode having fiberglass reinforcement that eliminates excessive tearing away of the cathode and allows the cathode to erode in a manner consistent with good sparker performance.

Another object of the invention is to provide sparkers enabling quick change out of the supporting assembly.

These and other objects of the invention will become more readily apparent from the ensuing specification when taken in conjunction with the appended claims.

DESCRIPTION OF THE PREFERRED EMBODIMENT

Figures 1, 2:
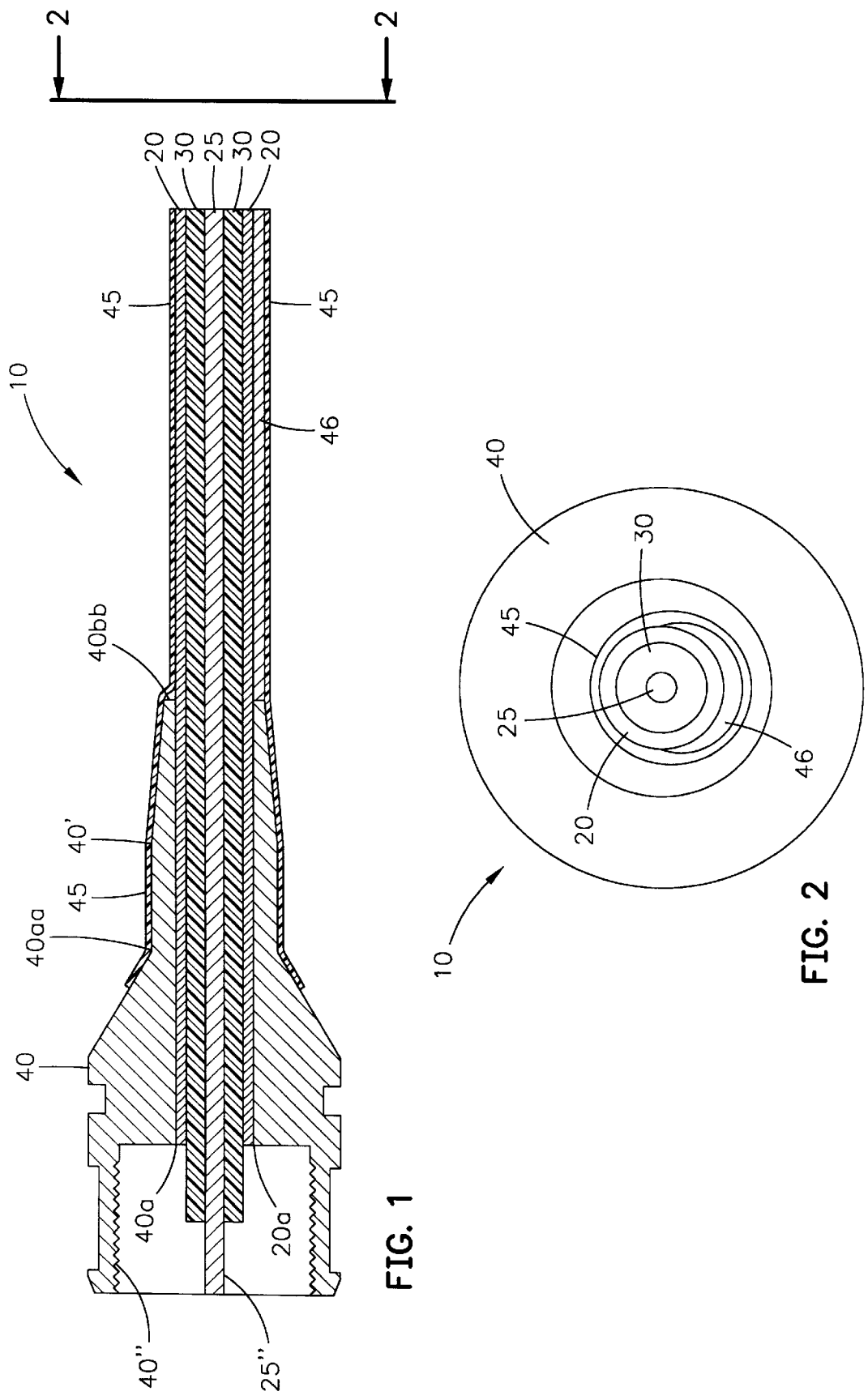
FIG. 1 is a longitudinal cross-sectional view of the coaxial sparker according to this invention.
FIG. 2 is a cross-sectional view taken alone lines 2—2 in FIG. 1 that shows details of the coaxial sparker.

Referring to FIG. 1 of the drawings, sparkler 10 has been developed to create the multitude of discharge bubbles for a pulse powered underwater acoustic source used for minesweeping. Sparker 10 is fabricated to be capable of repeatedly discharging at a nominal rate of about 10 Hz in saltwater environments for at least one hour or more without replacement or maintenance. Sparker 10 has an efficiency consistent with a useful minesweeping system, where efficiency is the ratio of acoustic energy emanated by sparker 10 to the energy stored in the discharge capacitors associated with the minesweeping system. Sparker 10 has been designed to have a minimal drag as it passes through the water at high speeds that range up to 35 knots.

Referring to FIGS. 1 and 2, the primary components of coaxial sparker 10 are depicted in cross section. A tubularly-shaped cathode 20 is coaxially disposed outwardly from anode 25 which coaxially extends the length of cathode 20. Insulator 30 is interposed between cathode 20 and anode 25 and fills the gap or space between them along their entire length. Cathode 20 is an outer cylindrical or tubular electrode operated at negative polarity and anode 25 is a center electrode rod operated at positive polarity. A representative embodiment of cathode 20 is standard alloy 122 copper tubing (99.90% copper and 0.02% phosphorous) with an outer diameter of 0.75 of an inch and 0.065 of an inch wall thickness. A representative embodiment of anode 25 is a 0.25 of an inch diameter rod made of composite metal material that has a composition of 70% copper and 30% tungsten (by weight). A representative example of insulator 30 is glass reinforced epoxy composite material such as the product marketed by Amalga Composites Inc. of 10600 W. Mitchell St., West Allis, Wis. 53214.

During assembly, tubularly-shaped cathode 20 is inserted in bore 41 in collar 40 and silver soldered along an annular end portion 20a of cathode 20 to a correspondingly shaped annular end portion 40a in the inside of collar 40. Collar 40 is fabricated from a suitable electrically conductive material having sufficient dimensions to bear the anticipated loads. The coaxially-extending, rod-shaped anode 25 is then epoxied into place throughout its length inside of cathode 20 with insulator 30. Insulator 30 is the glass reinforced epoxy composite material having uniform thickness and consistency, to fill the gap or spacing between cathode 20 and anode 25, and to assure and that there is no electrical contact between cathode 20 and anode 25. The outside of sparker 10 is reinforced to further assure structural integrity with an additional half section of metal tubing 46 on the aft section of the cathode and at least 5–7 layers 45 of fiberglass cloth material saturated with epoxy. The layers may be approximately 24 inches in length. Layers 45 adheres to the exterior of sparker 10 and covers the outside of cathode 20 and tubular half section 46 and overlaps at least part of collar 40. Layers 45 and tubular half section 46 ruggedize sparker 10 and helps it withstand some of the rigors associated with sequential, long term pulsed operation.

Figure 3:
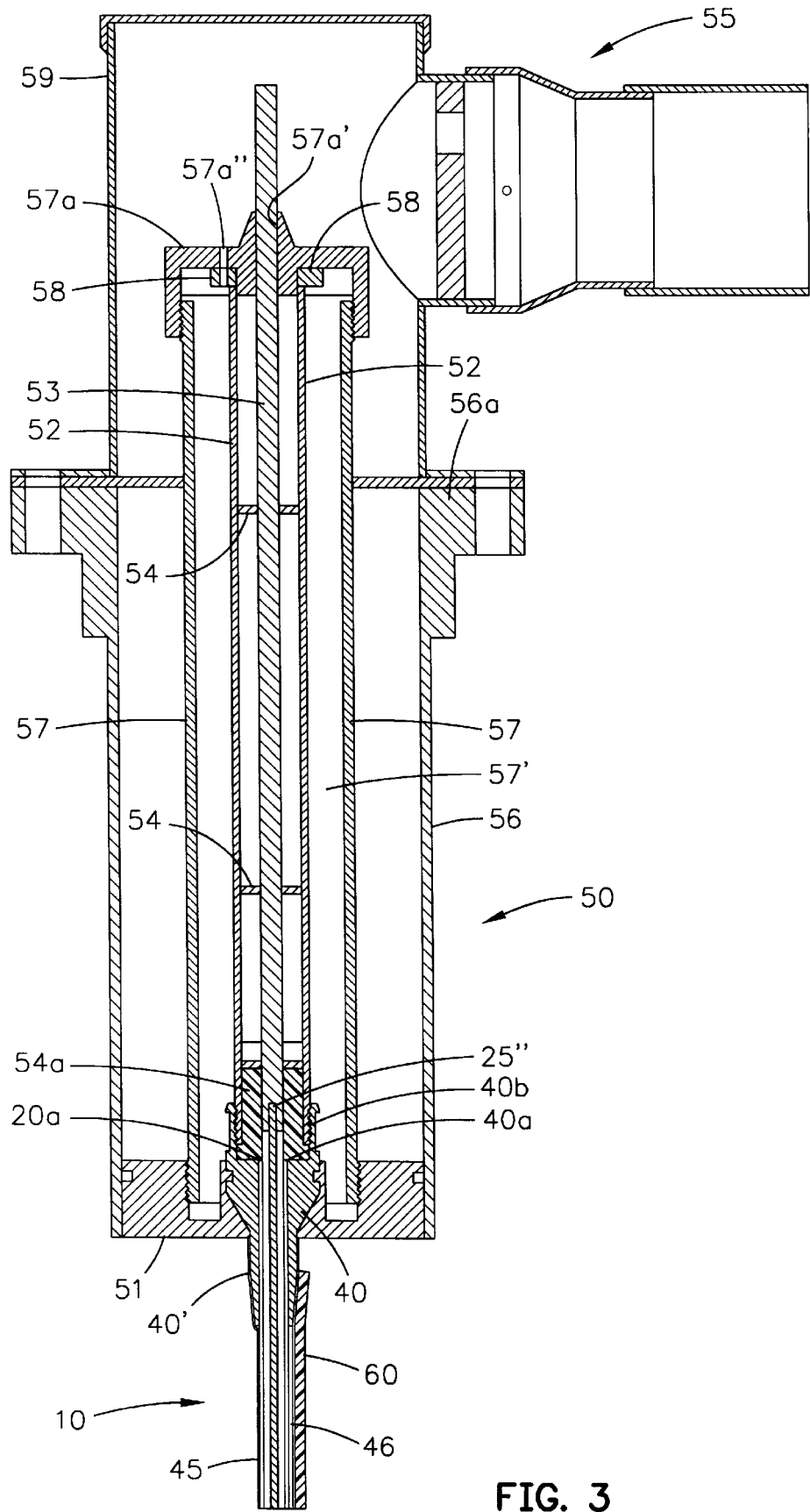
FIG. 3 cross-sectionally depicts the sparker in a mounting assembly extending through the hull of a boat.

Referring to FIG. 3, collar 40 serves as the solid structure that mounts sparker 10 on supporting assembly 50 in a boat, for example. Collar 40 also provides the necessary interface to connect sparker 10 to current carrying structures that extend to power lines on the deck of the boat. Collar 40 is fitted into sparker plug 51 of supporting assembly 50. Sparker plug 51 is mounted so that its outer surface is flush with the exterior bottom surface of the boat hull and the length of sparker 10 is in the water. Sparker 10 thereby extends outwardly from the hull and is oriented to project acoustic energy into the water. Cathode 20 is connected via threaded extension 40b to cathode connector 52 which is a 1.5 inch SCH 40 copper pipe. Anode 25 is connected via threaded extension 25" to anode connector 53 which is a 0.5 inch diameter copper rod. Conductor 53 is separated from conductor 52 by spacer rings 54 and isolator plug 54a. Connectors 52 and 53 bring electrical power to cathode 20 and anode 25 of sparker 10 from power cables (not shown) that reach through fitting 55. Fitting 55 is appropriately located above the deck to prevent water and other fouling from reaching the positive polarity connections interior of supporting assembly 50. The negative connections are at the same electrical voltage as the sea water.

Supporting structure 50 includes fiberglass stand pipe 56 that extends from an outward rim portion 56a on the deck of the boat to sparker plug 51. A four-inch pipe weldment 57 of copper and a four-inch pipe cap 57a made from an insulator material closes and defines chamber 57'. Conductor 53 extends through opening 57a' in cap 57a and bronze ring 58 disposed on cap 57a electrically contacts conductor 52. Electrical power leads (not shown) fed through fitting 55 are connected to conductor 53 and conductor 52 via opening 57a" and ring 58. Shield and cap structure 59 protects these connections from ambient influences and positions fitting 55.

As mentioned above, sparker 10 is mounted in sparker plug 51 of supporting assembly 50. During generation of a discharge bubble by sparker 10, a pulse of electrical current passes from anode 25 to cathode 20 where their ends are in the water. This causes the water in the region of the arc to vaporize and rapidly form an expanding bubble, the discharge bubble. The pressure in the bubble during the discharge is extremely high. After the discharge stops, the bubble will continue to expand until it reaches its maximum size which is much larger than the original volume. At this maximum size the pressure in the bubble is considerably less than the ambient pressure of the body of water around it. The bubble will then begin to collapse and return to near its original size during the discharge. The pressure in the bubble at collapse is typically equal to and often much more than the pressure during expansion. It is at these intense, short duration pulses created during expansion and collapse of the bubble when most of the sound emanating from the bubble is produced. Furthermore, these short duration pulses also cause most of the erosion of cathode 20, anode 25, and insulator 30 of sparker 10. Repetitive, high power sequences of such pulses can and do erode the components of sparker 10.

In accordance with this invention it was discovered that the pulsed power system used for this minesweeping system required that a cathode 20 (the negative, shorting electrode) had to be placed near anode 25 (the primary, positive electrode) to terminate the discharge before the next charging cycle began. Thus, the tubularly, or cylindrically-shaped cathode 20 was located coaxially around the primary electrode, anode 25. In addition, cathode 20 was located close enough to anode 25 to facilitate direct breakdown (instead of a corona discharge). This configuration has significantly better efficiency that the single electrode (corona) concept and was within the range for acceptable minesweeping applications. Additionally, the configuration of the invention assured the advantage of allowing the electrodes to erode together while maintaining an optimal gap spacing between them. Materials for cathode 20 and anode 25 and insulator 30 may be selected from a number of suitable materials available in the art to maintain this spacing while eroding at a reasonable or otherwise acceptable rate. The coaxial configuration of this invention has demonstrated better erosion characteristics than other arrangements of electrodes.

In other words, an important advantage of the coaxial configuration of sparker 10 is the potential to maintain a nominal constant gap spacing between anode 25 and cathode 20. To do this the erosion of the anode, insulation, and cathode must be approximately the same. Additionally, commercially available materials are used wherever possible so that sparker 10 is produced at reasonable costs. The materials for anode 25, cathode 20, and insulator 30 as well as their dimensions were determined empirically by experimenting with commercially available parts.

Rods for anode 25 are available from a number of suppliers and are the type normally used in industry for electrodischarge machining. These rods are manufactured by compressing mixtures of copper and tungsten granules at high pressures and sintering them at temperatures above the melting temperature of copper. The resulting material for anode 25 has been found to give a good combination of hardness for erosion resistance and good conductivity for maximum energy transfer. Other materials also are suitable.

Another critical phase in the development of sparker 10 has been finding and appropriately applying the best insulation material for insulator 30. Many materials for insulator 30 were found to be susceptible to the extreme shocks from the bubble expansion and collapse and tended to erode much faster and/or in a non-optimal fashion (fracturing, splitting, etc.) than the metal electrodes (cathode 25 and anode 20). Thus, the design of sparker 10 has also evolved to deal with the high stresses and erosion imposed on insulator 30 of sparker 10. These stresses and erosions are due to the repetitive expansions and collapses of the bubbles generated by the discharges. The erosion is typically well localized in insulator 30 and can shatter not only hard, brittle materials like ceramics but also tough but pliable materials such as those marketed under the trademark TEFLON. In addition, this localized erosion can also create a hot spot on the surface of insulator 30 that will precipitate the next discharge. The continuation of localized erosion will cause the erosion to "tunnel" into unsuitable insulator materials and eventually cause the performance of a sound source to prematurely deteriorate and/or destroy a large section of it.

In accordance with this invention, insulator 30 has been fabricated to erode with substantially axial uniformity to assure long life for sparker 10. One acceptable material for insulator 30 has been found to be glass fiber reinforced epoxy materials with the fiber mostly axially wound. In the Amalga product referred to above, a cyclo-aliphatic compound has been added to the epoxy to enhance the ability of the composite to hold off voltage breakdowns by providing an appropriate dielectric constant and to give additional heat resistance. The reinforcement is a plurality of electric grade glass fiber strands that are wetted with the epoxy and applied by winding the strands on the anode rod at maximum tension to give maximum glass content to the composite (~75–80%). This composite is given further lateral and longitudinal strength by adding several layers of a Nexis polyester cloth at different insulation thicknesses during the winding process. This was done to prevent the insulation of insulator 30 from breaking off and coming out in sections from sparker 10 during the discharge process.

The make up of cathode 20 was determined by trying the suitability of various sizes of commercially available stocks of tubing. While sparker 10 is firing, the length of cathode 20 does not necessarily have to exactly match that of insulator 30 and anode 25. If the erosion of anode 25 and insulator 30 are closely matched, the electrical gap between cathode 20 and anode 25 of sparker 10 will remain approximately the same and the exposed anode area will be minimal during operation of sparker 10. However, the tubing selected for cathode 20 does have to be rugged enough to withstand the tremendous forces exerted on it by the repetitive expansion and collapse of the discharge bubbles. When sparker 10 is operated in the stationary mode and not moving through the water, the collapses of the repetitive discharge bubbles will occur near anode 25 and inside cathode tube 20. This causes insulator 30 and anode 25 to erode at a faster rate. In addition, during these discharges, the inside wall of cathode 20 will experience high pressures which will ultimately cause it to "tear" away. This tearing is typically nonuniform and usually well below the end or top of anode 25 and insulator 30 to result in significant deteriorations of performance of sparker 10. The addition of the fiberglass reinforcement provided by layer 45 eliminates or, at least, reduces this problem and restricts the erosion of cathode 20 to be within limits that are consistent with good performance for sparker 10.

When sparker 10 is moving through the water at high speeds which may range from 15 to 30 knots, the discharge bubbles will move to the trailing edge or backside of sparker 10 which is opposite to the upstream side or direction that sparker 10 is traveling. The turbulence created behind sparker 10 tends to hold the discharge bubbles against the backside of the sparker cathode where the collapse of the bubbles will impose large bending forces on sparker 10 and accelerate erosion in this region. This accelerated erosion can ultimately "punch through" the cathode and insulation creating a new discharge site above the end of the cathode. While this does not stop sparker operation, it does cause premature erosion of the sparker and significantly shorten the lifetime of the sparker.

Therefore, collar 40 is designed to distribute the stresses on tubular cathode 20 where it intersects the bottom or end 40c of collar 40 where the bending stresses tend to be highest. The bottom segment 40' of collar 40 has been tapered from region 40aa to region 40bb of collar 40. The outer diameter of the lower, smaller end of the taper at region 40bb is two times the thickness of the walls of cathode tube 20 plus the outer diameter of cathode tube 20 or 0.88 inches. It is this taper from region 40aa to region 40bb that distributes the stresses on cathode tube 20 at the intersection with collar 40. Additionally, a half section of tubing 46 is suitably bonded to the aft section of cathode tube 20 from region 40bb to the bottom of sparker 10. The material used for tubing 46 can be the same as tubular cathode 20 or any other similarly dimensioned metal material. Half section 46 is bonded by epoxy or silver soldered to tubular cathode 20, and fiberglass reinforcing layers 45 are wrapped over tubular cathode 20 and half section 46. Thus, half section 46 provides additional sacrificial material for the erosion process of the bubble collapse as well as rigidity to sparker 10.

Spine structure 60 is incorporated into reinforcement layer 45 to further strengthen sparker 10 to withstand these large bending forces. Spine structure 60 may be four or five wraps of epoxy-laden fiberglass cloth that may be integrally formed with layer 45 or added later, and it may have a streamlined, tear-dropped cross-sectional shape or a rectangular cross section. It has been found to be especially important to include spine structure 60 at bottom or end 40c of collar 40 where cathode 20 exits since the bending stresses will be highest at this region.

Another salient feature of sparker 10 concerns the location of the solder joint attaching annular end portion 20a of cathode tube 20 to annular end portion 40a of collar 40. It was discovered that the soldering process tends to weaken cathode tube 20 where it is soldered. This makes it vulnerable to fatigue and breakage. Past experiments have shown this vulnerability to be a problem when the soldered joints were made at the locations corresponding to end 40c of collar 40 where the bending stresses are highest. Making the soldered joint between annular end portions 20a and 40a at the top of cathode tube 20 where it is flush with the inner surface of collar 40 reduces this problem.

Another feature of the design of sparker 10 is that it facilitates quick removal and replacement of sparkers 10 and collars 40 from supporting assembly 50. First, the cap portion of shield and cap structure 59 is removed after the electrical power leads have been detached. Next, insulator cap 57a is unthreaded from pipe 57. Since conductor 52 is threaded into threads 40b of collar 40 which is electrically coupled to cathode 20, and conductor 53 is secured to anode 25, removal of sparker 10 and collar 40 only requires that insulator cap 57a be lifted up and the entire unit or portions of it may be removed and replaced in just a few minutes. The collar may be recycled by cutting off cathode 20 at the end of collar 40 and boring out collar 40 to the required size of about 0.75 of an inch to receive new cathode 20. New cathode tube 20 can then be soldered into place and the anode/insulation assembly 25 and 30 is epoxied in cathode 20. Exterior fiberglass wraps 45 can be added to sparker 10. The disassembly procedure set out above is reversed to assemble new sparker 10 in supporting assembly 50 and to replace it in the boat.

Sparker 10 fabricated in accordance with the design set out hereinabove will provide at least one hour of continuous operation for one kiloJoule/shot at 10 Hz. Sparker 10 having a lifetime of at least 8 hours can be fabricated by making cathode 20, anode 25, and insulator 30 of sparker 10 from suitable materials and dimensioning them appropriately. However, a consequence of such a modification might be that the bending stresses will increase proportionally and might possibly result in premature failure of the longer cathode tube 20.

An extended life sparker 10 has extended lengths of the constituents cathode 20, anode 25, insulator 30, tubular half section 46, spine structure 60 and fiberglass layers 45 that overcome this possibility. Spine structure 60 is fabricated by adding additional fiberglass material to the aft-side of tubular cathode 20. The material can be shaped such that the cross section of sparker 10 would be teardrop-shaped to reduce hydrodynamic drag. The material would be on top of the extended lengths of tubular half section 46 and fiberglass layers 45 and would be wrapped around the whole assembly. The function of spine 60 is to further strengthen an extended sparker 10 so that it withstands the larger bending forces.

The exact configurations, dimensions, and materials selected for the constituents of sparker 10 may be decided by the requirements of the job at hand and the availability of parts and materials. Therefore, it is to be understood that, having the teachings of this invention in hand, one skilled in the art to which this invention pertains could configure sparker 10 in a variety of different shapes and sizes, and could select and apply a number of different fabrication materials without departing from the scope of this invention. Accordingly, in view of the adaptability of this invention, a designer is free to conform this invention to meet the requirements of a wide variety of underwater acoustic transmission tasks and still be within the scope of this invention.

It should be readily understood that many modifications and variations of the present invention are possible within the purview of the claimed invention. It is therefore to be understood that within the scope of the appended claims the invention may be practiced otherwise than as specifically described.

I claim:

1. A sparker for a pulsed underwater sound source comprising:

an elongate anode;

a tubularly-shaped cathode spaced apart from and coaxially extending the length of said elongate anode;

a cylindrically-shaped insulator filling the space between said tubularly-shaped cathode and said elongate anode to maintain a constant gap therebetween.

2. A sparker according to claim 1 further comprising;

a collar having an axial bore receiving said tubularly-shaped cathode, said elongate anode and said cylindrically-shaped insulator therethrough and being secured to said tubularly-shaped cathode.

3. A sparker according to claim 2 in which an annular end portion of said collar is soldered to an annular end portion of said tubularly-shaped cathode.

4. A sparker according to claim 3 in which said tubularly-shaped cathode and said elongate anode erode at substantially the same rate during operation to help maintain said gap.

5. A sparker according to claim 4 in which said cylindrically-shaped insulator erodes with axial uniformity during operation to reduce tunneling and premature deterioration.

6. A sparker according to claim 5 further comprising:

a tubular half section bonded to the exterior aft section of said tubularly-shaped cathode.

7. A sparker according to claim 6 further comprising:

wraps of fiberglass cloth material saturated with epoxy adhering to the exterior of said tubularly-shaped cathode and at least part of said collar.

8. A sparker according to claim 7 further comprising:

spine structure having wraps of epoxy-laden fiberglass cloth adhering to the exterior of said tubularly-shaped cathode and at least part of said collar.

9. A sparker according to claim 8 in which said spine structure has a streamlined, tear-dropped cross-sectional shape.

10. A sparker according to claim 8 in which said collar is tapered to distribute stresses on said tubularly-shaped cathode where it is adjacent to the bottom of said collar.

11. An apparatus for producing pulsed underwater sound comprising:

means for providing a rod-shaped anode;

means spaced apart from and coaxially extending the length of said rod-shaped anode providing means for defining a tubularly-shaped cathode; and means interposed between said rod-shaped anode providing means and said tubularly-shaped cathode defining means for filling the space between said rod-shaped anode providing means and said tubularly-shaped cathode defining means with a cylindrically-shaped insulator that maintains a constant gap therebetween.

12. An apparatus according to claim 11 in which said rod-shaped anode providing means is a rod made of composite metal material having a copper and tungsten composition.

13. An apparatus according to claim 12 in which said rod-shaped anode providing means is a 0.25 of an inch diameter rod.

14. An apparatus according to claim 13 in which said tubularly-shaped cathode defining means is standard alloy 122 copper tubing made from 99.90% copper and 0.02% phosphorous.

15. An apparatus according to claim 14 in which said tubularly-shaped cathode defining means has an outer diameter of 0.75 of an inch and 0.065 of an inch wall thickness.

16. An apparatus according to claim 15 in which said cylindrically-shaped insulator filling means is glass fiber reinforced epoxy material with the fiber being mostly axially wound.

17. An apparatus according to claim 16 in which said glass fiber reinforced epoxy material is a plurality of electric grade glass fiber strands wetted with epoxy and applied by winding the strands on said rod-shaped anode providing means at tension to give glass content to the composite of about 75–80%.

18. An apparatus according to claim 17 further comprising:

means for providing a collar having an axial bore receiving said tubularly-shaped cathode defining means, said rod-shaped anode providing means, and said cylindrically-shaped insulator filling means therethrough and being secured to said tubularly-shaped cathode defining means.

19. An apparatus according to claim 18 in which said collar providing means is tapered to distribute stresses on said tubularly-shaped cathode defining means where it is adjacent to the bottom of said collar providing means.

20. An apparatus according to claim 19 further comprising:

wraps of fiberglass cloth material saturated with epoxy adhering to the exterior of said tubularly-shaped cathode defining means and at least part of said collar providing means.

21. An apparatus according to claim 20 further comprising:

spine structure having wraps of epoxy-laden fiberglass cloth adhering to the exterior of said tubularly-shaped cathode defining means and at least part of said collar providing means.

* * * * *